US010251140B2

(12) United States Patent
Axnäs et al.

(10) Patent No.: US 10,251,140 B2
(45) Date of Patent: Apr. 2, 2019

(54) METHOD AND APPARATUS FOR SYNCHRONIZATION SIGNAL TRANSMISSION IN A WIRELESS COMMUNICATION SYSTEM

(71) Applicant: Telefonaktiebolaget LM Ericsson (publ), Stockholm (SE)

(72) Inventors: Johan Axnäs, Solna (SE); Robert Baldemair, Solna (SE); Igor Moaco Guerreiro, Fortaleza (BR); Dennis Hui, Sunnyvale, CA (US); Eleftherios Karipidis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 88 days.

(21) Appl. No.: 15/055,167

(22) Filed: Feb. 26, 2016

(65) Prior Publication Data
US 2017/0251441 A1  Aug. 31, 2017

(51) Int. Cl.
*H04W 56/00* (2009.01)
*H04W 72/04* (2009.01)
(Continued)

(52) U.S. Cl.
CPC ........ *H04W 56/001* (2013.01); *H04B 1/7083* (2013.01); *H04B 7/0491* (2013.01);
(Continued)

(58) Field of Classification Search
CPC .... H04B 7/0617; H04B 7/0695; H04B 7/088; H04J 11/0073; H04J 11/0076; H04W 56/001; H04W 72/046; H04W 72/085
See application file for complete search history.

(56) References Cited

U.S. PATENT DOCUMENTS 8,340,016 B1 * 12/2012 Miller ................ H04B 7/18519
370/326
8,909,950 B1  12/2014 Levchuk et al.
(Continued)

FOREIGN PATENT DOCUMENTS

WO  2015086079 A1  6/2015

OTHER PUBLICATIONS

3GPP, "3rd Generation Partnership Project. 3GPP TS 36.211 V11.2.0 (Feb. 2013). 3rd Generation Partnership Project; Technical Specification Group Radio Access Network; Evolved Universal Terrestrial Radio Access (E-UTRA); Physical Channels and Modulation (Release 11)", 3GPP TS 36.211 V11.2.0 (Feb. 2013), Feb. 2013, 1-109.
(Continued)

*Primary Examiner* — Mansour Oveissi
*Assistant Examiner* — David M Oveissi
(74) *Attorney, Agent, or Firm* — Murphy, Bilak & Homiller, PLLC

(57) ABSTRACT

In one aspect of the teachings herein, a radio network node advantageously adapts the transmission duration of a synchronization signal with respect to transmission of the synchronization signal in different directions. For example, the radio network node uses a shorter transmission duration in beam directions that are associated with better reception conditions and a longer transmission duration in beam directions that are associated with poorer reception conditions. As a consequence of varying the transmission duration according to received-signal qualities known or expected for the different directions, the radio network node can shorten the overall time needed to complete one synchronization-signal transmission cycle and use less energy, as compared to using a more conservative, longer transmission time in all beam directions.

19 Claims, 4 Drawing Sheets

(51) Int. Cl.
*H04W 72/08* (2009.01)
*H04B 1/7083* (2011.01)
*H04B 7/0491* (2017.01)
*H04B 7/06* (2006.01)
*H04B 7/08* (2006.01)
*H04J 11/00* (2006.01)
*H04L 1/00* (2006.01)
*H04W 48/00* (2009.01)

(52) U.S. Cl.
CPC ......... *H04B 7/0617* (2013.01); *H04B 7/0626* (2013.01); *H04B 7/0632* (2013.01); *H04B 7/0695* (2013.01); *H04B 7/088* (2013.01); *H04J 11/0073* (2013.01); *H04J 11/0076* (2013.01); *H04L 1/0026* (2013.01); *H04W 48/00* (2013.01); *H04W 72/046* (2013.01); *H04W 72/085* (2013.01)

(56) References Cited

U.S. PATENT DOCUMENTS

| | | | |
|---|---|---|---|
| 8,910,028 | B1 | 12/2014 | Li et al. |
| 2008/0292031 | A1* | 11/2008 | Sibers ............... H04W 52/0283 375/341 |
| 2010/0091729 | A1 | 4/2010 | Yang et al. |
| 2011/0032149 | A1 | 2/2011 | Leabman et al. |
| 2013/0142082 | A1 | 6/2013 | Cavalcante et al. |
| 2015/0085795 | A1* | 3/2015 | Papasakellariou .... H04L 5/0044 370/329 |
| 2015/0304868 | A1* | 10/2015 | Yu ....................... H04W 56/001 370/312 |
| 2016/0373136 | A1 | 12/2016 | Ismail et al. |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.6.0 (Sep. 2015), Sep. 2015, 1-95.

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.1.0, Mar. 2014, 1-186.

Barati, C. N. et al., "Directional Cell Search for Millimeter Wave Cellular Systems", IEEE 15th International Workshop on Signal Processing Advances in Wireless Communications (SPAWC), 2014, 120-124.

Guerreiro, Igor M. et al., "Power-Efficient Beam Sweeping for Initial Synchronization in mm-Wave Wireless Networks", IEEE 16th International Workshop on Signal Processing Advances in Wireless Communications (SPAWC), 2015, 276-280.

Kschischang, Frank R. et al., "Factor Graphs and the Sum-Product Algorithm", IEEE Transactions on Information Theory, vol. 47, No. 2, Feb. 2001, 498-519.

* cited by examiner

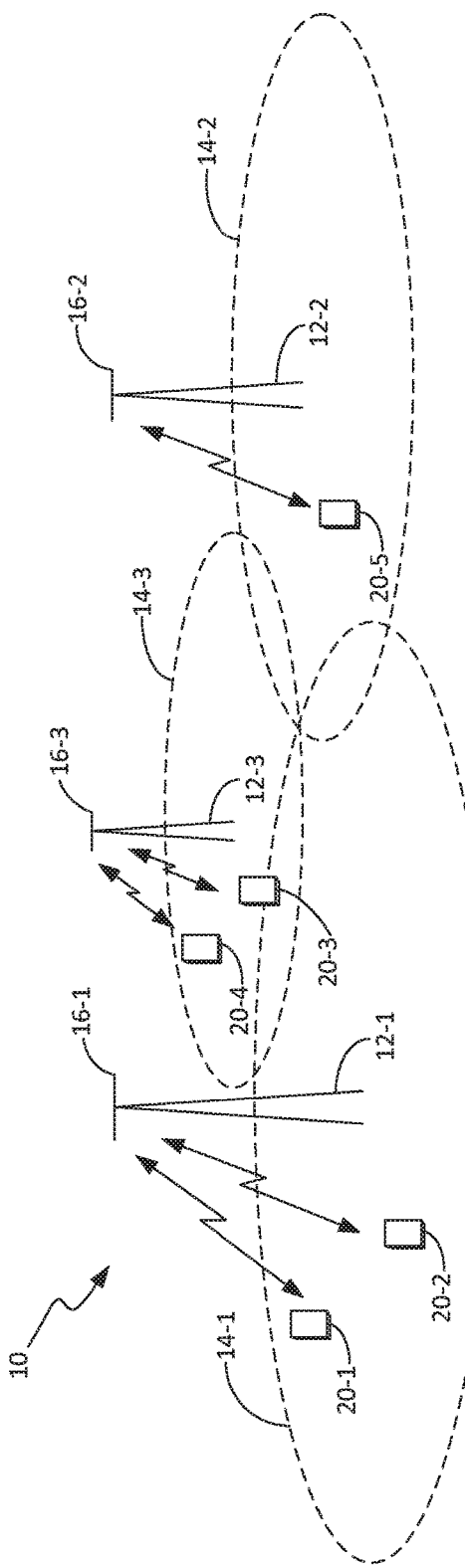
FIG. 1
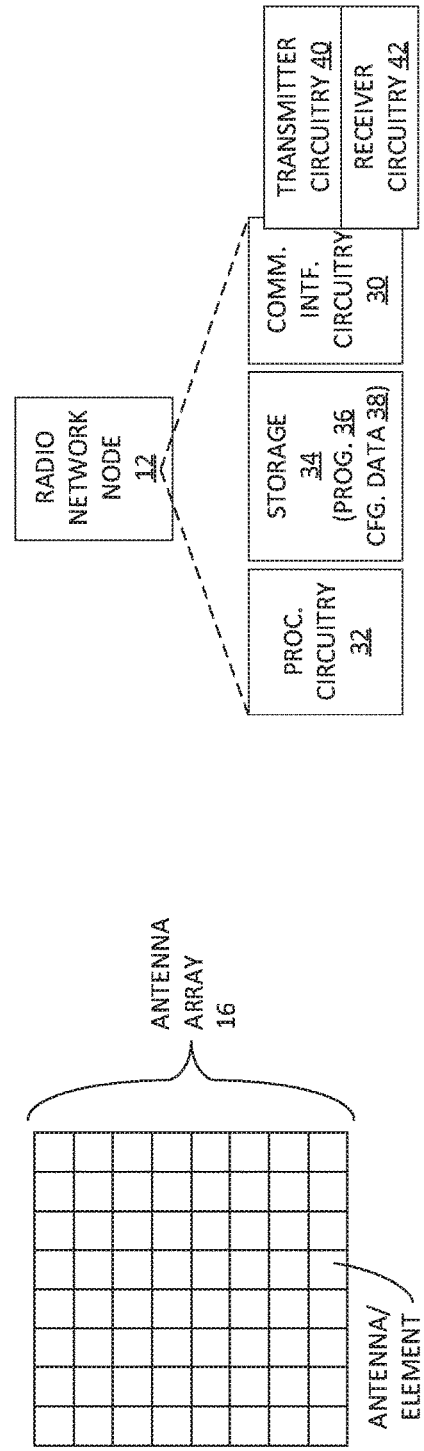
FIG. 2
FIG. 4

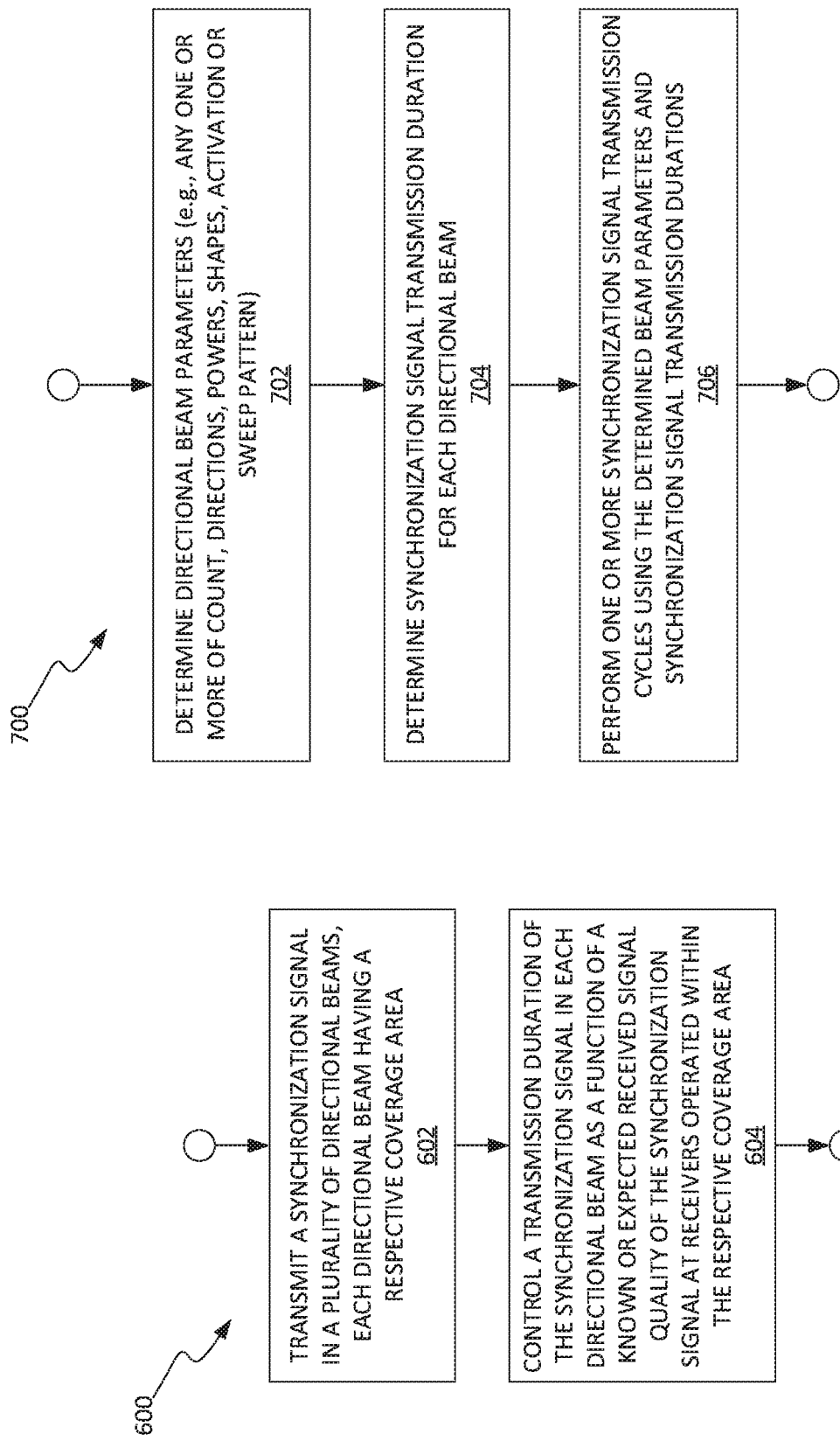

METHOD AND APPARATUS FOR SYNCHRONIZATION SIGNAL TRANSMISSION IN A WIRELESS COMMUNICATION SYSTEM

TECHNICAL FIELD

The present invention relates to wireless communication networks, and particularly relates to the transmission of synchronization signals for use in connecting to such networks.

BACKGROUND

Wireless communication devices configured for operation in public land mobile networks (PLMNs), and certain other types of wireless communication systems perform an initial access procedure after powering on or when reactivating after an extended period of sleep. As a first step in the initial access procedure, the wireless communication device searches for and detects a synchronization signal that base stations or other access points in the network regularly broadcast.

The synchronization signals enable the wireless communication devices to align with the network in frequency and time, based on using the synchronization signals from a given access point to determine symbol boundaries in the network transmissions and thereby align their reception and transmission timing and frequencies with the network. A "symbol," for example, comprises an Orthogonal Frequency Division Multiplex (OFDM) symbol, a pre-coded OFDM symbol, a single-carrier symbol, etc. However, the term "symbol" shall be given broad construction in this disclosure, because the teachings herein are not limited to a particular modulation scheme.

Such alignment in time and frequency is essential for subsequent communication. Example information about synchronization in existing systems, such as in networks based on the Long Term Evolution (LTE) standards, can be found in the following Third Generation Partnership Project (3GPP) Technical Specifications (TSs): 3GPP TS 36.211, version 11.2.0, 3GPP TS 36.212, and 3GPP TS 36.213, version 12.1.0.

Note that the 3GPP documentation refers to wireless communication devices as items of "user equipment," where "UE" denotes a single wireless device and "UEs" denotes plural wireless devices. The term "wireless communication device" as used herein encompasses the term "UE" and more. Indeed, unless otherwise noted, the term encompasses essentially any type of wireless communication apparatus that is configured to communicate within a wireless communication network. Without limitation, then, the term "wireless communication device" encompasses smart phones, feature phones, cellular network modems and dongles, Machine Type Communication (MTC) or Machine-to-Machine (M2M) devices, along with wireless-enabled computers, laptops, tablets, and the like.

Wireless communication devices may also perform procedures similar to the initial-access synchronization when preparing for a handover between different coverage areas in the network—e.g., a cellular handover from one network cell to another network cell, within a cellular communication network. In such contexts, the wireless communication device may have a connection to a currently-serving cell, but may wish to evaluate reception conditions with respect to one or more neighboring cells. However, here, the network may provide assistance information to the wireless communication device, to reduce the time needed for acquiring neighboring-cell signals.

Conventionally, network radio nodes transmit synchronization signals using a few sector-wide beams, e.g., each covering up to 120 degrees of circular arc. These sector-wide synchronization-signal beams are transmitted essentially simultaneously and together cover the entire geographic zone or area that the radio node is intended to serve. As recognized herein, that approach to synchronization-signal transmission may be undesirable in future wireless communication systems.

For example, future communication systems are expected to make heavy use of high-gain narrow beamforming, to enable high-data-rate transmission coverage for distant users that could not be served at high data rates without the gain provided by beamforming. Providing these users with synchronization signals of sufficient received-signal quality also may require the use of beamforming. Further, at least some network implementations are expected to use grids of relatively narrow beams and it may not be possible in such systems to transmit beams having broad coverage within the overall service area.

As a further recognition herein, transmitting a synchronization signal at the same power in a wide beam over all directions may represent wasted energy. For example, the geographic coverage area surrounding a radio node may have an irregular shape because of obstructions or other geographic features in the area around the radio node. As a consequence, the maximum distance of users to be served from the radio node will not be uniform in all directions.

At least some of the above issues may be addressed by using a narrow, swept beam for synchronization signal transmission from a radio node. However, it is recognized herein that certain challenges arise when using a swept beam for synchronization signal transmission. For example, latency problems may arise as a consequence of wireless communication devices waiting for the beam to sweep through the azimuthal and/or vertical angles corresponding to their positions relative to the radio node. As another example, the utilization efficiency of radio resources by the radio node may be compromised by conventional approaches to swept-beam transmission of synchronization signals.

SUMMARY

In one aspect of the teachings herein, a radio network node advantageously adapts the transmission duration of a synchronization signal with respect to transmission of the synchronization signal in different directions. For example, the radio network node uses a shorter transmission duration in beam directions that are associated with better reception conditions and a longer transmission duration in beam directions that are associated with poorer reception conditions. As a consequence of varying the transmission duration according to received-signal qualities known or expected for the different directions, the radio network node can shorten the overall time needed to complete one synchronization-signal transmission cycle and use less energy, as compared to using a more conservative, longer transmission time in all beam directions.

An example method of operation performed by a radio network node in a wireless communication network comprises transmitting a synchronization signal in a plurality of directional beams, each directional beam having a respective coverage area. The transmission operations include controlling a transmission duration of the synchronization signal in each directional beam as a function of a known or expected received signal quality of the synchronization signal at receivers operated within the respective coverage area. Historical data, such as previously or continuously accumulated reception statistics regarding various receivers operating in the respective beam coverage areas may be used by the radio network node to determine the expected received signal qualities associated with the different beam directions.

In another example, a radio network node is configured for operation in a wireless communication network and comprises transmitter circuitry configured to transmit a synchronization signal in a plurality of directional beams, via an associated antenna array, each directional beam having a respective coverage area. The radio network node further comprises processing circuitry included in or operatively associated with the transmitter circuitry and configured to control a transmission duration of the synchronization signal in each directional beam as a function of a known or expected received signal quality of the synchronization signal at receivers operated within the respective coverage area. Here, the term "receiver" emphasizes the reception operation with respect to synchronization signals, but encompasses essentially any type of transceiver that may be operated within the network.

In another example, a computer-readable medium stores a computer program comprising program instructions that, when executed by processing circuitry in a radio network node configured for operation in a wireless communication network, configures the radio network node to transmit a synchronization signal in a plurality of directional beams. The directional beams are transmitted via an associated antenna array, and each directional beam has a respective coverage area, e.g., a portion of an overall coverage area served by the radio network node. The computer program further comprises instructions configuring the radio network node to control a transmission duration of the synchronization signal in each directional beam as a function of a known or expected received signal quality of the synchronization signal at receivers operated within the respective coverage area.

In a related example, a computer program product comprising program code operable to configure a radio network node to transmit a synchronization signal in a plurality of directional beams, via an associated antenna array, each directional beam having a respective coverage area. The program further includes code operable to configure the radio network node to control a transmission duration of the synchronization signal in each directional beam as a function of a known or expected received signal quality of the synchronization signal at receivers operated within the respective coverage area.

In yet another example, a radio network node is configured for operation in a wireless communication network and includes a transmitter module and a control module. These modules comprise, for example, functional modules implemented via processing circuitry within the radio network node. The transmitter module is configured to transmit a synchronization signal in a plurality of directional beams, via an associated antenna array, each directional beam having a respective coverage area. The control module is configured to control a transmission duration of the synchronization signal in each directional beam as a function of a known or expected received signal quality of the synchronization signal at receivers operated within the respective coverage area.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a wireless communication network.

FIG. 2 is a block diagram of one embodiment of an antenna array comprising a plurality of antennas or antenna elements, such as may be used for directional transmissions.

FIG. 4 is a block diagram of one embodiment of a radio network node that is configured for directional beam transmissions, such as in the network depicted in FIG. 1.

FIG. 6 is a logic flow diagram of one embodiment of a method of synchronization signal transmission, with respect to a plurality of directional beams.

FIG. 7 is a logic flow diagram of example details for the method depicted in FIG. 6.

DETAILED DESCRIPTION

Figure 3:
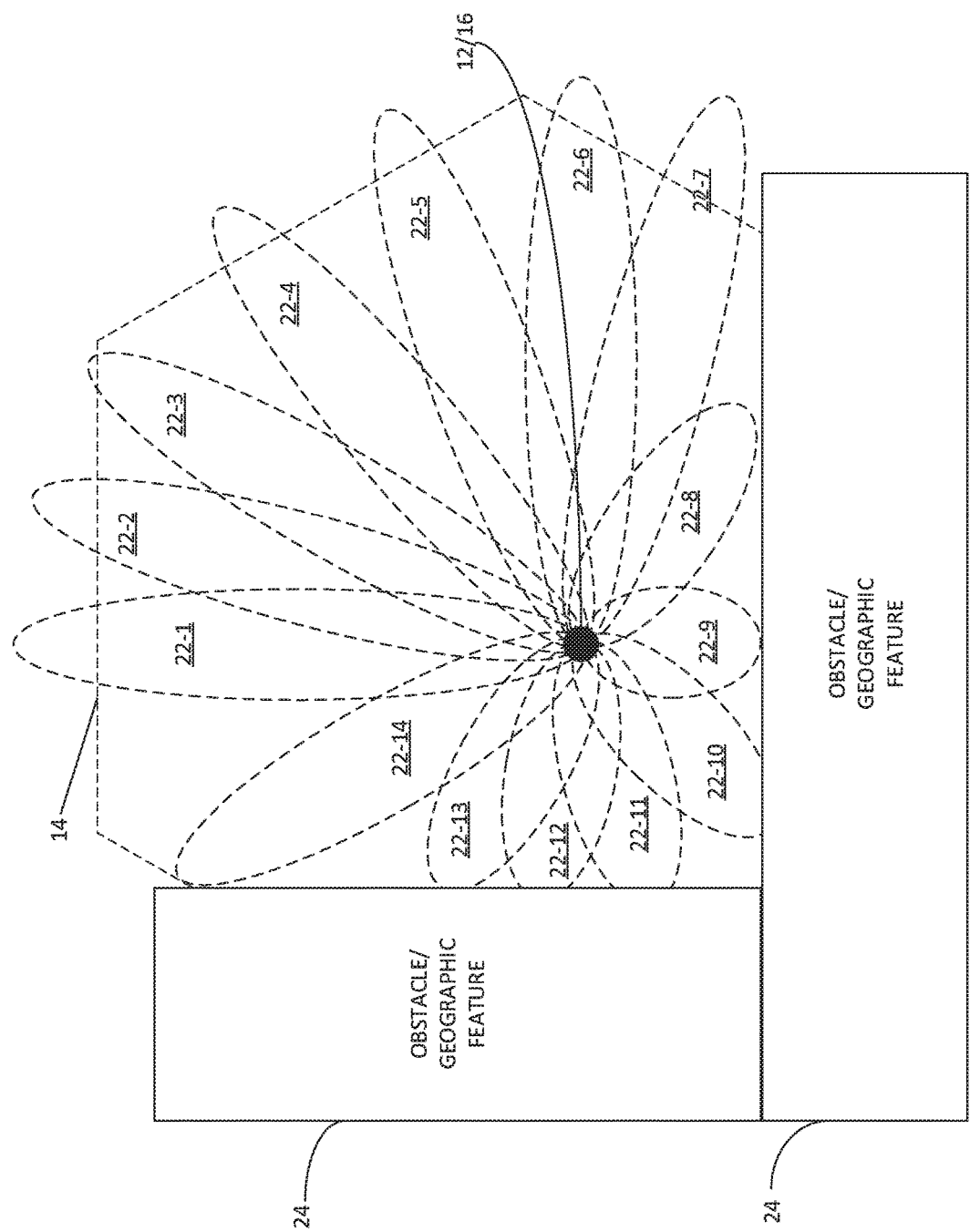
FIG. 3 is a diagram of an example pattern of directional beams, as transmitted by a radio network node.

By way of non-limiting example, FIG. 1 illustrates one embodiment of a wireless communication network 10 that is configured to use beamforming for synchronization signal transmissions. While not so limited, the network 10 may be a wide-area cellular radio network based on the Long Term Evolution (LTE) standard, or based on an another Third Generation Partnership Project (3GPP) standard.

The network 10 includes one or more radio network nodes 12, which comprise base stations, access points, or the like. In the LTE context, the radio network nodes 12 are eNBs. Three radio network nodes 12-1, 12-2, and 12-3 by way of example. Each radio network node 12 provides radio service in a corresponding, overall coverage area 14, e.g., a "cell." While any given one or more of the radio network nodes 12 may provide more than one cell, e.g., using different radio resources for each one, the diagram depicts each radio network node 12 as corresponding to a single overall coverage area 14. Thus, the overall coverage area 14-1 corresponds to the radio network node 12-1, the overall coverage area 14-2 corresponds to the radio network node 12-2, and so on. The overall coverage areas 14 may overlap.

Of particular interest herein, and as illustrated in FIG. 2, one or more of the radio network nodes 12 include an antenna array 16 that comprises a number of antenna elements 18. Such radio network nodes 12 are configured to use a corresponding antenna array 16 for transmit beamforming towards different portions of their overall coverage areas, e.g., to provide improved signal quality for wireless communication devices 20 variously positioned around them, as shown in FIG. 1.

While FIG. 1 illustrates wireless communication devices 20-1 through 20-5, it shall be appreciated that a lesser or greater number of wireless communication devices 20 may be operating within the network 10 at any given time. It shall also be understood that the wireless communication devices 20 are not necessarily all of the same type or function. Example wireless communication devices 20 include any one or more of smartphones, feature phones, wireless computers, communication network adaptors, dongles, Machine-Type Communication (MTC) devices, which are also referred to as M2M devices, etc.

FIG. 3 illustrates a given radio network node 12 in the network 10 that is configured to transmit a plurality of directional beams 22, where directional beams 22-1 through 22-14 are shown by way of example for illustration. Fewer beams 22 or more beams 22 may be configured and not all radio network nodes 12 will necessarily operate with the same number, shape, or configuration of beams 22. Further, the number of beams 22 used by a given radio network node 12, or the beam parameters associated therewith, may be adapted from time to time.

As seen, the overall coverage area 14 surrounding the radio network node 12 may include obstructions or geographic features 24 that dictate or, at least, influence the possible locations of wireless communication devices 20. The beam configuration used by the radio network node 12 may reflect such obstructions or features, e.g., by using shorter-range beams 22 (lower power) in some beam directions and longer-range (higher power) beams 22 in other beam directions. Here, it shall be understood that the phrase "beam direction" encompasses azimuthal directions (horizontal angles), or elevational directions (vertical angles), or both. Thus, a given beam direction may be defined by horizontal and/or vertical angles or angular ranges. Each directional beam 22 provides coverage for a portion of the overall coverage area 14 of the radio network node 12, and that portion is referred to as the respective coverage area of the directional beam 22.

Turning to FIG. 4, an example radio network node 12 comprises communication interface circuitry 30, processing circuitry 32, and storage 34. The communication interface circuitry 30 comprises communication interface circuitry configured for communicating with one or more wireless communication devices 20. Such circuitry includes radiofrequency transmitter circuitry 40 and receiver circuitry 42. Further, the communication interface circuitry 30 may include other interface circuitry not explicitly shown, such as a network communication interface, e.g., an S1 interface, for communicating one or more nodes in a "core network," and an inter-base-station communication interface, e.g., an X2 interface, for communication with other radio network nodes 12.

The processing circuitry 32 comprises fixed circuitry, programmed circuitry, or a mix of fixed and programmed circuitry. In an example embodiment, the processing circuitry 32 comprises one or more microprocessor-based circuits or one or more DSP-based, FPGA-based, or ASIC-based circuits, or any mix thereof. In a particular example, the processing circuitry 32 is specially adapted or otherwise configured to operate according to the radio network node method(s) of operation herein, via the execution of computer program instructions comprising a computer program 36. The processing circuitry 32 may further use and/or store various items of configuration data 38 associated with such operation, via the storage 34.

The storage 34 comprises any one or more of solid-state storage, disk storage, etc., and may provide both volatile, working memory and non-volatile, program and data storage. The storage 34, therefore, may include a mix of memory or storage circuit or device types. Non-limiting examples include SRAM or DRAM, FLASH, EEPROM, and Solid State Disk (SSD) storage. In any case, it shall be understood that in one or more embodiments the storage 34 includes a non-transitory computer-readable medium storing a computer program 36, the execution of which by processing circuitry in the radio network node 20 configures the processing circuitry 32 according to the teachings herein. Non-transitory, as used here, does not necessarily mean permanent or unchanging, but does denote storage of at least some persistence.

In an example embodiment, the transmitter circuitry 40 is configured to transmit a synchronization signal in a plurality of directional beams 22, via an associated antenna array 16. Each directional beam 22 has a respective coverage area, which is defined by the direction and shape or size of the directional beam 22. Correspondingly, the processing circuitry 32, which is included in or associated with the transmitter circuitry 40, is configured to control a transmission duration of the synchronization signal in each directional beam 22. Here, the duration is controlled as a function of a known or expected received signal quality of the synchronization signal at receivers operated within the respective coverage area. The term "receiver" as used here broadly refers to any device or apparatus that can receive signals from the radio network node 12 and report received signal quality, e.g., essentially any type of wireless communication device 20. Therefore, the term "receiver" and the phrase "receiver 20" are used interchangeably with the term "wireless communication device" and the phrase "wireless communication device 20."

Received signal quality may be "known" for a given beam direction, based on receiving signal quality reports from one or more wireless communication devices 20 that are operating within the respective coverage area of a given directional beam. Additionally, current reporting may supplement, or be supplemented by, prior reporting either from the same wireless communication devices 20, or from other wireless communication devices 20 that have previously operated in the respective coverage area and reported signal quality.

Received signal quality may be "expected" for a given beam direction based on statistics, e.g., as compiled from signal quality reports collected from various wireless communication devices 20 that were operated within the respective coverage area. Notably, to the extent that the radio network node 12 in some embodiments is configured to adapt its directional beam configuration from time to time—e.g., beam number, beam directions, beam shapes, etc.—the statistical data used to determine the expected signal quality may be limited to that data collected for a beam configuration that is the same or substantially similar to the current beam configuration.

In at least one embodiment, the processing circuitry 32 of the example radio network node 12 is configured to control the transmission duration of the synchronization signal in each directional beam 22 for each of one or more synchronization signal transmission cycles. Here, each synchronization signal transmission cycle is defined as one "set" of synchronization signal transmissions for the plurality of directional beams 22. In other words, for each synchronization signal transmission cycle, there is one instance of synchronization signal transmission of a controlled transmission duration, for each directional beam 22.

Each such "instance" may use particularly allocated radio resources—contiguous or not in time and/or frequency—and may span a defined number of symbol times, subframes, or another defined unit of time. Correspondingly, in one such embodiment, the processing circuitry 32 is configured to control the transmission duration of the synchronization signal in each directional beam 22 by controlling the number of symbol times over which the synchronization signal is transmitted in each directional beam 22, for each instance of synchronization signal transmission in the directional beam 22. Further, in at least one embodiment, the "instance" of synchronization signal transmission in a given beam direction may span only a fraction of a symbol time, or another defined time unit, where very short transmission times of this sort are useful in beam directions associated with very good reception conditions.

According to some embodiments, the processing circuitry 32 is configured to activate the plurality of directional beams 22 one at a time, according to an activation pattern. For example, the processing circuitry 32 activates the individual directional beams 22 among the plurality of directional beams 22 according to a random pattern, within each synchronization signal transmission cycle. It is also contemplated herein that the processing circuitry 32 in one or more embodiments transmits the synchronization signal in more than one directional beam 22 at a time, e.g., in all of the directional beams 22 or selected subsets of them.

In the same or another embodiment, the processing circuitry 32 is configured to perform a succession of synchronization signal transmission cycles, each synchronization signal transmission cycle comprising one instance of synchronization signal transmission in each of the plurality of directional beams 22. Consequently, there is a new instance of synchronization signal transmission in each directional beam 22 at a desired repetition rate, as defined by a cycle time of the synchronization signal transmission cycle.

Because the processing circuitry 32 is configured to control the transmission duration of the synchronization signal in given beam directions, the overall cycle time can be reduced, by reducing the transmission duration in beam directions that have better signal quality. The processing circuitry 32 may use individualized values for the respective beam directions, or may have a set of values—e.g., short, medium, and long transmission time values—that it selects from according to the reception conditions known or expected for each beam direction.

In a further example of "tenability" or "adaptability," the processing circuitry 32 in one or more embodiments is configured to adapt over time at least one of: beam directions, beam powers, beam count, beam coverage areas, and the transmission duration for the synchronization signal as transmitted in one or more of the directional beams 22. Any one or more of these adaptations may be configured by, e.g., an associated Operations and Maintenance (O&M) node in the network 10, or may be adapted based on statistical observations made by the radio network node 12.

The particular behavior of the radio network node 12 may be defined by one or more configured values. Here, the term "configured" does not necessarily mean unchanging or permanent but does connote a value that is used at least for some period of operation. In one such embodiment, the processing circuitry 32 is configured to control the transmission duration of the synchronization signal in each directional beam 22 according to a corresponding configured value. The configured value is based on the known or expected received signal quality of the synchronization signal at receivers 20 operated within the respective coverage area of the directional beam 22. In at least one such embodiment, the processing circuitry 32 is configured to determine the configured value for each directional beam 22 in dependence on historical data collected for one or more receivers 20 operated at various times in the respective coverage area of the directional beam 22.

Figures 5, 8:
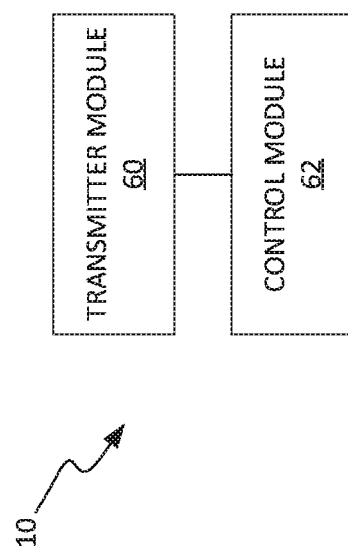
FIG. 5 is a diagram of one embodiment of a data structure comprising configured values that define the transmission duration of a synchronization signal in each directional beam, along with defining one or more beam parameters.
FIG. 8 is a block diagram of one embodiment of a radio network node comprising one or more operational or functional modules.

More generally, in at least some embodiments the processing circuitry 32 is configured to operate according to a data structure that comprises configured values that define the transmission duration of the synchronization signal in each directional beam 22, along with defining one or more beam parameters configuring at least one of: beam count, beam shape, beam power, and beam direction. FIG. 5 depicts an example data structure 50, which includes fields or registers corresponding to the aforementioned configuration parameters.

FIG. 6 illustrates an example method 600 of processing implemented by a radio network node 12. The method 600 includes transmitting (Block 602) a synchronization signal in a plurality of directional beams 22, where each directional beam 22 has a respective coverage area—i.e., provides coverage for a portion of an overall service or coverage area associated with the radio network node 12. The method 600 includes controlling (Block 604) a transmission duration of the synchronization signal in each directional beam 22 as a function of a known or expected received signal quality of the synchronization signal at receivers 20 operated within the respective coverage area. While Block 604 appears as a separate operation or step for purposes of illustration, it will be understood as comprising part of the overall transmission control performed in Block 602 for the directional beams 22.

FIG. 7 illustrates another method 700 of operation at a radio network node 12. The method 700 can be understood as a more detailed example of the method 600. The method 700 includes determining (Block 702) directional-beam parameters, e.g., any one or more of beam count, beam powers, beam shapes, beam activation or sweep pattern, etc. Further, the method 700 includes determining (Block 704) the synchronization signal transmission duration for each directional beam 22 and performing (Block 706) one or more synchronization signal transmission cycles using the determined beam parameters and synchronization signal transmission durations.

Notably, some beam parameters may be fixed or, at least, may have a longer span between updating as compared to other beam parameters. For example, the transmission durations and/or beam powers may be updated more frequently than beam count or beam directions. On the other hand, it should be understood that one or more operating scenarios do not update the configured parameters, or update them relatively slowly or only as needed—e.g., when a network configuration changes.

While the methods 600 and 700 may be implemented in the radio network node 12 seen in the example embodiment of FIG. 4, other architectures or implementation details may be used. In more general terms, a radio network node 12 includes processing circuitry that is adapted programmatically or otherwise to implement functions or modules that operate according to the method operations set forth herein.

FIG. 8 depicts such an arrangement, wherein the radio network node 12 includes a transmitter module 60 that is configured to transmit a synchronization signal in a plurality of directional beams 22, via an associated antenna array 16, each directional beam 22 having a respective coverage area. The radio network node 12 further includes a control module 62 configured to control a transmission duration of the synchronization signal in each directional beam 22 as a function of a known or expected received signal quality of the synchronization signal at receivers 20 operated within the respective coverage area.

As a further aspect of the teachings herein, an example radio network node 12 is configured to vary beam power as well as synchronization signal transmission duration, for different ones of the directional beams 22. For example, the transmission power of the synchronization signal is lower for one or more directional beams 22, as compared to one or more other ones of the directional beams 22. Lower beam power is used, for example, for beam directions associated with good reception conditions. This approach may be particularly useful in systems where all users in certain directions have so good channel quality that even a single symbol is unnecessarily long time to provide synchronization signals to them in a reliable manner, e.g., according to a desired detectability margin.

It is also contemplated that the radio network node 12 balances or otherwise sets the beam power and synchronization signal transmission time for given beam directions in tandem. For example, in scenarios where it is more important to reduce latency by minimizing the synchronization signal transmission cycle time, beam power may be increased so as to allow shorter synchronization signal transmission durations. In other scenarios, the transmission duration for one or more directional beams 22 may be increased, to allow a lower beam transmission power for the synchronization signal transmissions.

In at least one embodiment, the repetitions of the synchronization signal in beam directions associated with poor reception conditions are not contiguous in time, but rather spread out in time, e.g., a set of symbols substantially evenly distributed over a beam sweep or transmission cycle. With such an arrangement, the receivers 20 that are operating in any of the affected coverage areas but experiencing good received signal quality would more frequently receive a synchronization signal, thereby even further reducing latency for them.

For example, in one cycle of synchronization signal transmission—where the synchronization signal is transmitted at least once in each of the beam directions—there may be two or more transmissions of the synchronization signal in any of the directional beams 22, where the transmissions are not contiguous in time. Further, in at least one such embodiment, during the gap between non-contiguous synchronization signal transmissions on a given directional beam 22, there may be one or more synchronization signal transmissions on one or more other ones of the directional beams 22. Thus, one or more of the directional beams 22 may be active more than once, over any given sweep or cycle of synchronization signal transmission, and the activation of directional beams 22 during one sweep may be randomized, or follow a defined pattern, which may include a hopping sequence and/or multiple activations for given beam directions.

In some embodiments, the transmission duration for the synchronization signal in the different beam directions is expressed as Duration=$N_d \times T_{unit}$, where $T_{unit}$ is a base unit of time and $N_d$ is an integer that may differ between different directions d. The time unit $T_{unit}$ may be one symbol time, for example. Of course, different types of networks may define different symbol times.

In at least one embodiment, the scanning or sweep order for transmitting the directional beams 22 within one transmission cycle is deterministic and predetermined. In another embodiment, the scanning order is pseudo-random according to a certain probability distribution that allocates different amounts of time for synchronization signal transmission in the different beam directions on average. The random scanning order has the advantage of averaging out the interference caused by synchronization signal transmissions from neighboring radio network nodes 12. More generally, in one or more embodiments contemplated herein, the scanning order at one or more radio network nodes 12—e.g., at respective neighboring nodes—is configured to reduce synchronization signal interference between radio network nodes 12.

As a further example, the transmission duration of the synchronization signal for each directional beam 22 is configured according to a desired detection margin for receivers 20 operating in the respective coverage area. Such adaptations may, of course, reflect a time granularity—e.g., adjustments made in whole units of time. However, the operational goal here is to provide substantially the same detection margin for the synchronization signal across the respective coverage areas of the directional beams 22, based on adapting the transmission duration of the synchronization signal in each such direction, to reflect the better or poorer reception conditions known or expected for the different directions.

Additionally, in one or more embodiments, the beam width is varied between two or more of the beam direction. Increasing the beam width enables faster scanning of the synchronization signal through the overall coverage area of the radio network node 12, but comes at the expense of reducing how far the directional beam 22 reaches. Such tradeoffs are viable, however, at least in beam directions associated with good reception conditions, and there is not any particular need to use highly-directional beams.

As a further example of the variations and extensions contemplate herein, in one or more embodiments, transmission of the synchronization signal in directional beams 22 is used to determine the particular beam directions to use for subsequent data communications with wireless communication devices 20 operating in the respective beam coverage areas. To facilitate this aspect of operation, the synchronization signal may be differentiated on a per-beam basis. For example, different transmission signal sequences, or different offsets within the same overall sequence, may be used in the different beam directions. In this manner, a wireless communication device 20 operating that may receive the synchronization signal in more than one directional beam 22 can distinguish between the synchronization signal conveyed in the different beams 22. Consequently, the radio network node 12, or the network 10 at large, can associate received-signal quality feedback for its synchronization signal transmissions with particular ones of the directional beams 22, even for simultaneous or temporally proximate transmissions of the synchronization signal in different ones of the beams 22.

While the above example embodiments provide a number of implementation details, it will be appreciated that a radio network node 12 in one or more embodiments is configured to perform a set of top-level actions or operations. Namely, the radio network node 12 determines a suitable transmission duration for transmitting a synchronization beam in each spatial direction (beam direction), determines the order in which the synchronization signal transmissions will be conducted for the different spatial directions, and performs the spatially oriented transmissions of the synchronization signal according to the determined transmission durations and order. Effectively, this approach can be understood as sweeping a steered beam through all directions of interest, with shorter transmission times used in directions associated with good received signal quality and longer transmission times used in directions associated with less good received signal quality.

Varying the transmission duration in this manner allows the radio network node 12 to ensure that sufficient signal energy is provided in all directions. Here, the term "sufficient" denotes the energy level associated with a defined received-signal detection capability or margin. Further, varying the transmission duration in this manner reduces the overall scan time for transmitting the synchronization signal in all directions. In turn, the shorter scan time frees radio resources that the radio network node 12 can put to use for data communications with the various wireless communication devices 20 that it serves.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation performed by a radio network node in a wireless communication network, the method comprising:
    configuring synchronization-signal transmissions by the radio network node according to a configured set of beamforming parameters, the configured set of beamforming parameters including a transmit duration value for each beam direction associated with a plurality of directional beams, wherein the transmit duration value for each beam direction defines the duration of synchronization-signal transmission in the beam direction for each synchronization-signal transmission cycle performed by the radio network node via the plurality of directional beams, and wherein the transmit duration value for each beam direction depends on an expected received-signal quality for the synchronization signal in a coverage area corresponding to the beam direction; and
    for each synchronization-signal transmission cycle, transmitting the synchronization signal in each beam direction with the duration of synchronization-signal transmission defined by the transmit duration value corresponding to the beam direction.

2. The method of claim 1, wherein each synchronization-signal transmission cycle comprises one instance of synchronization-signal transmission in each beam direction, such that there is a new instance of synchronization-signal transmission in each beam direction at a desired repetition rate, as defined by a cycle time of the synchronization-signal transmission cycle.

3. The method of claim 1, further comprising activating the plurality of directional beams one at a time, for each synchronization-signal transmission cycle, according to an activation pattern.

4. The method of claim 3, wherein activating the plurality of directional beams one at a time, according to the activation pattern, comprises activating individual ones of the directional beams among the plurality of directional beams according to a random pattern, within each synchronization-signal transmission cycle.

5. The method of claim 1, wherein the expected received-signal quality for the synchronization signal in the coverage area corresponding to each beam direction is a statistical value determined from past signal quality reports sent from given wireless communication devices while operating in the coverage area.

6. The method of claim 1, wherein the configured set of beamforming parameters defines at least one of: beam count, beam shape, beam power, and beam direction.

7. The method of claim 1, wherein, with reference to a defined unit of time used to time the duration of synchronization-signal transmission in each beam direction, the transmit duration value configured for each beam direction defines the duration in whole or fractional units of time.

8. The method of claim 1, wherein there is a new instance of synchronization signal transmission in each beam direction at a desired repetition rate, as defined by a cycle time of the synchronization-signal transmission cycle.

9. The method of claim 1, further comprising accumulating signal quality reports from given wireless communication devices operating in one or more of the coverage areas corresponding to one or more of the beam directions, and for each such beam direction, adapting the transmit duration value in dependence on updating the expected received-signal quality for the synchronization signal in the corresponding coverage area, in statistical dependence on the accumulated signal quality reports.

10. A radio network node configured for operation in a wireless communication network and comprising:
    transmitter circuitry associated with an antenna array that is configured to transmit signals for wireless communication devices via a plurality of directional beams, each directional beam having a respective beam direction and corresponding coverage area; and
    processing circuitry included in or operatively associated with the transmitter circuitry and configured to:
        configure synchronization-signal transmissions by the radio network node according to a configured set of beamforming parameters, the configured set of beamforming parameters including a transmit duration value for each beam direction associated with the plurality of directional beams, wherein the transmit duration value for each beam direction defines the duration of synchronization-signal transmission in the beam direction for each synchronization-signal transmission cycle performed by the radio network node via the plurality of directional beams, and wherein the transmit duration value for each beam direction depends on an expected received-signal quality for the synchronization signal in the coverage area corresponding to the beam direction; and
        for each synchronization-signal transmission cycle, transmit the synchronization signal in each beam direction with the duration of synchronization-signal transmission defined by the transmit duration value corresponding to the beam direction.

11. The radio network node of claim 10, wherein each synchronization-signal transmission cycle comprises one instance of synchronization-signal transmission in each beam direction, such that there is a new instance of synchronization-signal transmission in each beam direction at a desired repetition rate, as defined by a cycle time of the synchronization-signal transmission cycle.

12. The radio network node of claim 10, wherein the processing circuitry is configured to activate the plurality of directional beams one at a time, for each synchronization-signal transmission cycle, according to an activation pattern.

13. The radio network node of claim 12, wherein the processing circuitry is configured to activate the plurality of directional beams one at a time, according to the activation pattern, by activating individual ones of the directional beams among the plurality of directional beams according to a random pattern, within each synchronization-signal transmission cycle.

14. The radio network node of claim 10, wherein the expected received-signal quality for the synchronization signal in the coverage area corresponding to each beam direction is a statistical value determined from past signal quality reports sent from given wireless communication devices while operating in the coverage area.

15. The radio network node of claim 10, wherein the configured set of beamforming parameters defines at least one of: beam count, beam shape, beam power, and beam direction.

16. The radio network node of claim 10, wherein, with reference to a defined unit of time used to time the duration of synchronization-signal transmission in each beam direction, the transmit duration value configured for each beam direction defines the duration in whole or fractional units of time.

17. The radio network node of claim 10, wherein there is a new instance of synchronization-signal transmission in each beam direction at a desired repetition rate, as defined by a cycle time of the synchronization-signal transmission cycle.

18. The radio network node of claim 10, wherein the processing circuitry is configured to accumulate signal quality reports from given wireless communication devices operating in one or more of the coverage areas corresponding to one or more of the beam directions, and for each such beam direction, adapting the transmit duration value in dependence on updating the expected received-signal quality for the synchronization signal in the corresponding coverage area, and statistical dependence on the accumulated signal quality reports.

19. A method of operation performed by a radio network node in a wireless communication network, the method comprising:

transmitting synchronization signals from the radio network node in each one of recurring synchronization-signal transmission cycles, wherein each synchronization-signal transmission cycle comprises transmitting a synchronization signal in each beam direction among a plurality of beam directions; and configuring, for each beam direction, a duration of synchronization-signal transmission to be used in each synchronization-signal transmission cycle, based on an expected received-signal quality statistically determined from past signal-quality reports sent by wireless communication devices operated in a coverage area corresponding to the beam direction, such that the duration of synchronization-signal transmission used for at least a first beam direction is shorter than the duration of synchronization-signal transmission used for at least a second beam direction, based on the first beam direction having a relatively higher expected received-signal quality than the second beam direction.

* * * * *